Patented Apr. 7, 1936

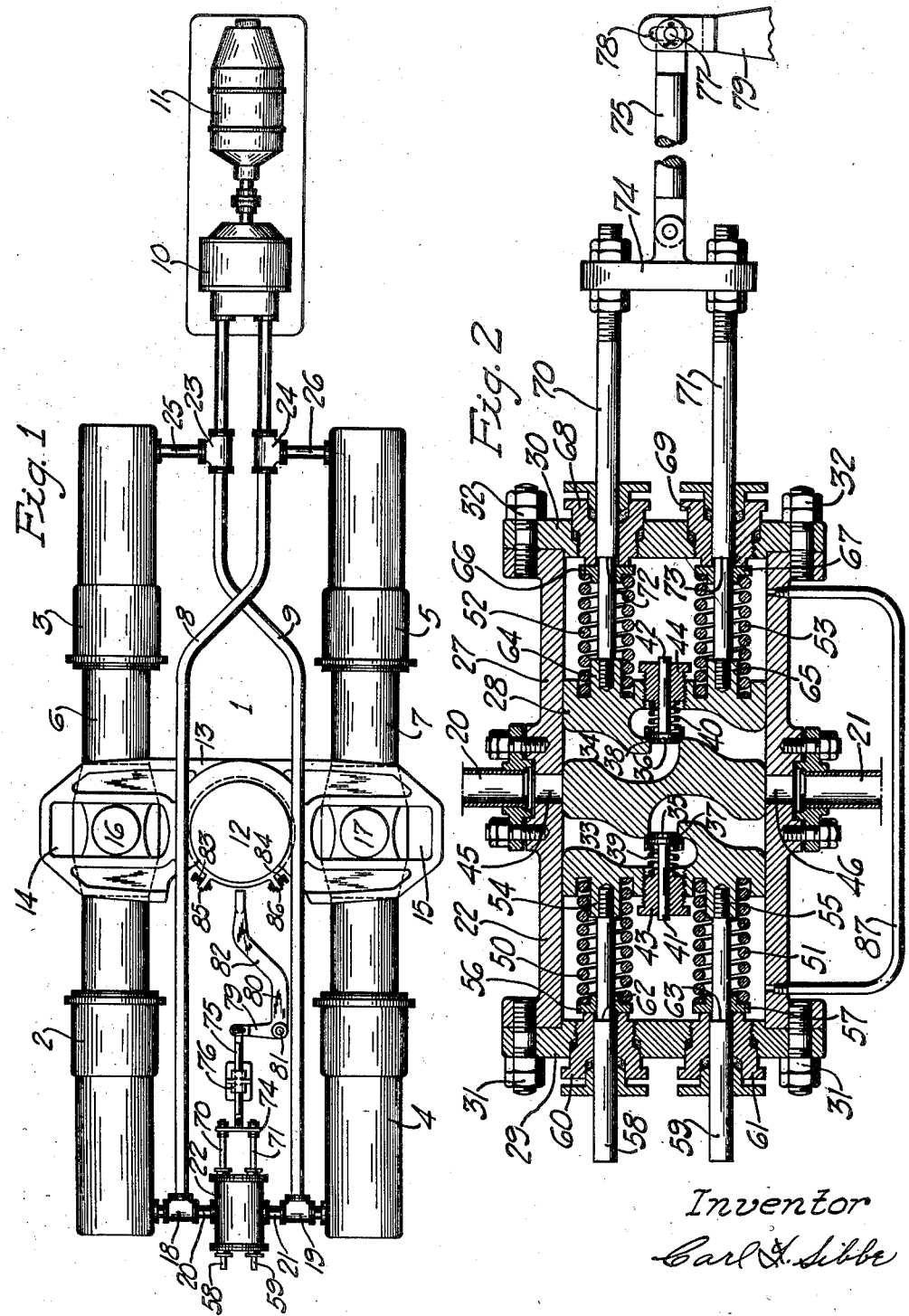

2,036,237

UNITED STATES PATENT OFFICE 2,036,237

FLUID MOTOR

Carl F. Sibbe, Philadelphia, Pa., assignor to American Engineering Company, Philadelphia, Pa., a corporation of Pennsylvania Application May 8, 1934, Serial No. 724,467

15 Claims. (Cl. 60—52)

This invention relates to fluid motors, and more particularly to fluid motors of the reciprocating plunger type.

One object of the present invention is to provide a generally improved and simplified valve mechanism for fluid motors of the stated character which functions to permit fluid from the pressure side of the motor to bypass to the exhaust side thereof under predetermined conditions, to equalize the pressure in the system and thus prevent shock or damage to the operating parts.

Another object is to provide in a fluid motor of the stated character an adjustable bypass element which is actuated to one position of adjustment when the plungers approach their limit of travel in one direction to permit fluid from the cylinders subjected to pressure to bypass to the cylinders connected to exhaust, and which is actuated to another position of adjustment to permit fluid from the cylinders subjected to pressure to bypass to the cylinders connected to exhaust when the plungers approach their limit of travel in the opposite direction, to equalize the pressure in the system and thereby prevent shock or damage to the operating parts.

A further object is to provide a bypass valve construction of the stated character having a plurality of passages provided therein, one of which is rendered effective when the motor plungers approach their limit of travel in one direction, and another of which is rendered effective when the rams approach their limit of travel in the reverse direction, and to provide check valves in said passages which become effective to prevent a reverse flow of fluid through said passages when equalization of the pressures in the system has been effected.

Other and further objects will become apparent as the description of the invention progresses.

Of the drawing:

Fig. 1 is a plan view of the assembled construction including the bypass valve unit comprising the present invention, and the operating mechanism therefor.

Fig. 2 is a sectional plan view of the bypass valve unit and a portion of the operating mechanism therefor.

Referring to the drawing, the numeral 1 designates generally a fluid motor comprising aligned cylinders 2, 3 and 4, 5 having rams 6 and 7 respectively, operating therein. Cylinders 2 and 5 are connected by a pipe 8 leading from a variable stroke reversible discharge pump 10. Cylinders 3 and 4 are likewise connected by a pipe 9 leading from the opposite side of pump 10. Pump 10 may be driven by an electric motor 11, or by any other suitable driving means, and may be of the general type shown and described in the United States patent to Hele-Shaw 1,077,979, or of any other suitable type.

In the present instance fluid motor 1 is employed to operate a rudder, the stock thereof being designated by the numeral 12. Rudder stock 12 is secured to a crosshead 13 having a pair of slots 14 and 15 provided at the ends thereof which receive studs 16 and 17 secured to and extending upwardly from rams 6 and 7 respectively. Pipes 8 and 9 are provided at one end thereof with T couplings 18 and 19 respectively, to which are connected branch pipes 20 and 21 which connect one end of cylinders 2 and 4 with a bypass valve designated generally by the numeral 22. Cylinders 3 and 5 are connected to pipes 9 and 8 respectively, by branch pipes 25 and 26, through T couplings 23 and 24.

Referring to Fig. 2, valve mechanism 22, it is seen, comprises a substantially cylindrical casing 27 having a reciprocable valve member 28 operating therein, and a pair of end plates 29 and 30 secured to cylinder 27 by bolts 31 and 32 respectively. Valve 28 is substantially cylindrical in construction and is provided with a pair of spaced passages 33 and 34 having a pair of check valves 35 and 36 respectively, provided intermediate the ends thereof. Valves 35 and 36 are normally held upon their respective seats 37 and 38 by a pair of springs 39 and 40. The stems 41 and 42 of valves 35 and 36, respectively, extend through and are guided in the central bores of a pair of plugs 43 and 44, which are secured in axially aligned tapped apertures provided at the opposite ends of valve 28. The tension of springs 39 and 40 may be varied by simply adjusting plugs 43 and 44.

Fig. 2 shows valve 28 in normal position wherein the solid portion thereof between passages 33 and 34 registers with apertures 45 and 46 provided in casing 27, which apertures communicate with branch pipes 20 and 21, respectively. Valve member 28 is held in its central position as shown in Fig. 2, by a pair of springs 50 and 51 provided at the left hand end thereof, and a pair of similar springs 52 and 53 provided at the right hand end thereof. Springs 50 and 51 extend between spring seats 54 and 55 formed in the left hand end of valve member 28, and adjustable spring seats 56 and 57. A pair of guide rods 58 and 59 are secured to the left hand end of valve member 28 and the enlarged portions thereof extend through the central bores of a pair of plugs 60 and 61 secured in tapped apertures provided in end plate 29. The annular shoulders 62 and 63 formed by the enlarged portion of rods 58 and 59 engage spring seats 56 and 57 respectively, when valve member 28 is shifted to the right, to thereby retain the springs in proper position. Springs 52 and 53 likewise extend between spring seats 64 and 65 provided in the right hand end of valve member 28, and a pair of adjustable spring seats 66 and 67. The tension of springs 52 and 53 may be adjusted by a pair of plugs 68 and 69 secured in tapped apertures provided in end plate 30. A pair of guide rods 70 and 71 are secured to the right hand end of valve member 28 and the enlarged portions thereof extend through the central bores provided in plugs 68 and 69. The shoulders 72 and 73 formed by enlarged portions of said rods engage spring seats 66 and 67 when valve member 28 is shifted to the left to thereby retain springs 52 and 53, respectively, in proper position. The outer ends of rods 70 and 71 are connected to a cross bar 74 to which a guide rod 75 is operatively connected. Rod 75 operates in a guide bearing 76, as shown in Fig. 1. The outer end of rod 75 is provided with a stud 77 which engages into a slot 78 provided in arm 79 of a bell crank lever 80. Bell crank lever 80 is pivoted to a fixed support indicated at 81, and the other arm 82 thereof is bent so that the free end thereof lies substantially midway between the pair of adjustable bolts 83 and 84 secured in a pair of ears 85 and 86 respectively projecting outwardly from rudder stock 12, when crosshead 13 is in normal position. By this arrangement, it is seen that when crosshead 13 approaches its limit of travel in a clockwise direction bolt 84 will engage bell crank lever 80 thereby rocking the latter in a counterclockwise direction which in turn actuates valve member 28 to the left, to bring passage 34 thereof into alignment with pipes 20 and 21. It is also seen that when crosshead 13 approaches its limit of travel in a counter clockwise direction, bolt 83 will engage bell crank lever 80, thereby rocking the same in a clockwise direction to move valve member 28 to the right, bringing passage 33 provided therein into alignment with pipes 20 and 21. In order to insure proper operation of valve member 28 in the event that fluid should leak past valve member 28 and into the chambers at the opposite ends thereof a bypass pipe 87 is provided. By this construction it is seen that any fluid contained in the chambers at the ends of valve 28 will simply bypass from one end of the casing to the other upon movement of said valve member.

From the foregoing description it is seen that when pump 10 is so adjusted as to deliver fluid pressure to cylinders 3 and 4, crosshead 13 will move in a counter clockwise direction and that when said crosshead approaches its limit of travel valve 28 will be shifted to the right (Fig. 2) as previously described, thereby aligning passage 33 thereof with pipes 20 and 21. Fluid pressure entering passage 33 from pipe 21 will then unseat check valve 35 and permit fluid to pass through passage 34 into branch pipe 20 and thence to the ends of cylinders 2 and 5 thereby equalizing the pressure in all the cylinders and causing cushioning of the rams and final stoppage thereof. At this time pump 10 has been adjusted to neutral position. Mechanisms for controlling pumps in this manner are well known in the art and for a full disclosure of such a mechanism reference may be had to the United States patent to R. C. Lamond No. 1,986,640. When the pressure is equalized in this manner spring 39 will urge check valve 35 upon its seat, and further passage of fluid therethrough is prevented. Now, in the event that pump 10 were so adjusted as to deliver fluid pressure to cylinders 2 and 5, check valve 35 will be also held upon its seat by the pressure entering passage 33 through pipe 20 and acting upon the face of said valve. Crosshead 13 will now move in a clockwise direction and when it approaches its limit of travel bolt 84 engaging bell crank lever 80 will shift valve 28 to the left (Fig. 2) aligning passage 34 with branch pipes 20 and 21. Fluid entering passage 34 from pipe 20 will now unseat check valve 36 and thereby permit fluid to also pass to cylinders 4 and 3, thereby equalizing the pressures in the system. At this time pump 10 has again been adjusted to neutral as above described, and when the pressure has again become equalized spring 40 will urge check valve 36 upon its seat and further passage of fluid through passage 34 is thereby prevented. When crosshead 13 moves in the reverse direction from which it has been previously operated bringing bolts 83 or 84 out of contact with bell crank lever 80, springs 50, 51 or 52, 53, as the case may be, will actuate valve member 28 to the neutral position shown in Fig. 2. By providing the shoulders 62 and 63 on rods 58 and 59 it is seen that when valve 28 is moved to the right springs 50 and 51 will also move to the right and thus remain properly positioned upon their respective seats. The same is true in connection with springs 52 and 53. When valve member 28 is moved to the left the shoulders 72 and 73 provided on rods 70 and 71 respectively, will engage seats 66 and 67, and move the springs 52 and 53 bodily to the left and thereby retain them in proper position upon their respective seats.

Suitable stuffing boxes are provided to prevent leakage of fluid past guide rods 58, 59 and 70, 71. Suitable packing is also provided in the apertures in which plugs 60, 61 and 68, 69 are secured to further prevent leakage of fluid from the valve mechanism.

The valve member 28 may comprise but a single casting. The valve seats 37 and 38 for check valves 35 and 36 respectively, may be machined by simply inserting the tool through the apertures in which the plugs 43 and 44 are secured. The casing enclosing the valve member 28 is also of a simplified construction. It therefore is seen that the valve mechanism as a whole is not only of simplified construction but may be manufactured at a relatively low cost.

The invention has been shown applied to a motor comprising a pair of rams, but it is believed to be apparent that the invention is equally applicable to fluid motors employing but a single ram. In such a construction the bypass valve 22 is simply placed in the pipe lines connecting the ends of the cylinders with the pump and is operated by movement of a crosshead similar to that shown herein. It is also believed to be apparent that valve member 28 may be shifted to the right or left upon movement of the rams through the instrumentality of projections provided on the rams themselves. Such a construction may be desirable in installation where the crosshead is not in close proximity to the motor. The specific construction of valve member 28, as illustrated herein, may also take other forms without departing from the present invention.

It therefore is to be understood that the invention is not to be limited to the embodiment herein shown, since it may be embodied in other forms, all coming within the scope of the claims which follow.

What is claimed is:

1. In a device of the class described, the combination with a fluid motor, of a bypass valve unit interposed between the opposite ends of said motor, said unit comprising a casing, a valve member mounted in said casing adapted for movement to different positions of adjustment to permit fluid to pass from the pressure end of the motor to the exhaust end thereof when said motor approaches its limit of travel in either direction.

2. In a device of the class described, the combination with a fluid motor, of a bypass valve unit operatively connected to said motor, said unit comprising a casing and a valve member movable in said casing to different positions of adjustment, to permit fluid to pass from the pressure end of the motor to the exhaust end thereof when said motor approaches its limit of travel in either direction, and means for actuating said valve member to ineffective position.

3. In a device of the class described, the combination with a fluid motor, of a bypass valve unit operatively connected to said motor, said unit comprising a casing and a valve member movable in said casing to different positions of adjustment to permit fluid to pass from the pressure end of the motor to the exhaust end thereof when said motor approaches its limit of travel in either direction, and adjustable resilient means for normally retaining said valve member in ineffective position.

4. In a device of the class described, the combination with a fluid motor, of a bypass valve unit operatively connected to said motor, said unit comprising, a casing and a valve member movable in said casing, a plurality of bypass means provided in said member, means for normally retaining said member in ineffective position, means for moving said member to one position of adjustment to render effective one of said bypass means to permit fluid to bypass from the pressure end of said motor to the exhaust end thereof when the motor approaches its limit of travel in one direction, and means for moving said member to another position of adjustment to render another of said bypass means effective to permit fluid to bypass from the pressure end of said motor to the exhaust end thereof when said motor approaches its limit of travel in the reverse direction.

5. In a device of the class described, the combination with a fluid motor, of a bypass valve unit operatively connected to said motor, said unit comprising a casing, and a valve member movable in said casing to different positions of adjustment, resilient means provided at either end of said valve member for normally retaining the same in ineffective position, means for moving said member to one of its positions of adjustment to permit fluid to bypass from the pressure end of the motor to the exhaust end thereof when said motor approaches its limit of travel in one direction, means for moving said member to another position of adjustment to permit fluid to bypass from the pressure end of the motor to the exhaust end thereof when said motor is operated in a reverse direction, and means for retaining said resilient means in proper position during movement of said valve member.

6. In a device of the class described, the combination with a fluid motor, of a bypass valve unit operatively connected to said motor, said unit comprising a casing, and a valve member movable in said casing, a plurality of bypass means provided in said member, resilient means provided at either end of said valve member for normally retaining the latter in ineffective position, means for moving said member to one position of adjustment to render effective one of said bypass means to permit fluid to bypass from the pressure end of said motor to the exhaust end thereof when the motor approaches its limit of travel in one direction, means for moving said member to another position of adjustment to render another of said bypass means effective to permit fluid to bypass from the pressure end of said motor to the exhaust end thereof when said motor approaches its limit of travel in a reverse direction, said resilient means being adapted to actuate said valve member to ineffective position, and means for retaining said resilient means in proper position during operation of said valve member.

7. In a device of the class described, the combination with a rudder stock, of a fluid motor for actuating said rudder stock, a bypass valve unit operatively connected to said motor, said unit comprising a casing, and a valve member movable in said casing to different positions of adjustment to permit fluid to pass from the pressure end of the motor to the exhaust end thereof when said motor approaches its limit of travel in either direction, and means operatively connected to said rudder stock for actuating said valve member to different positions of adjustment.

8. In a device of the class described, the combination with a rudder stock, of a fluid motor for actuating said rudder stock, a bypass valve unit operatively connected to said motor, said unit comprising a casing, and a valve member movable in said casing, resilient means for normally retaining said member in ineffective position, means provided on said rudder stock for actuating said valve member to one position of adjustment to permit fluid to pass from the pressure end of the motor to the exhaust end thereof when said motor approaches its limit of travel in one direction, and additional means provided on said rudder stock for actuating said valve member to another position of adjustment to permit fluid to pass from the pressure end of said motor to the exhaust end thereof when said motor approaches its limit of travel in the reverse direction.

9. In a device of the class described, the combination with a rudder stock, of a fluid motor for actuating said rudder stock to different positions of adjustment, a bypass valve unit operatively connected to said motor, said unit comprising a casing and a valve member movable in said casing, a plurality of bypass means provided in said member, means for normally retaining said member in ineffective position, means provided on said rudder stock for moving said member to one position of adjustment to render effective one of said bypass means to permit fluid to bypass from the pressure end of said motor to the exhaust end thereof when the motor approaches its limit of travel in one direction, and additional means provided on said rudder stock for moving said member to another position of adjustment to render another of said bypass means effective to permit fluid to bypass from the pressure end of said motor to the exhaust end thereof when said motor approaches its limit of travel in the reverse direction.

10. In a device of the class described, the combination with a rudder stock, of a fluid motor for actuating said rudder stock to different positions of adjustment, said motor comprising, a ram, and a pair of cylinders embracing the opposite ends of said ram, a bypass valve unit operatively connected to the opposite ends of said motor, said unit comprising a casing, and a valve member movable in said casing, means for moving said valve member to one position of adjustment to permit fluid to pass from the cylinder subjected to pressure to the cylinder connected to exhaust when the ram is actuated in one direction, and additional means for actuating said valve member to another position of adjustment to permit fluid to pass from the other of said cylinders subjected to pressure to the cylinder connected to exhaust when said ram is actuated in the reverse direction.

11. In a device of the class described, the combination with a fluid motor comprising, a pair of rams, cylinders embracing the opposite ends of each of said rams, piping connecting the cylinders of one of the rams with the diagonally opposed cylinders of the other ram, a pump for supplying fluid pressure to either of said connected pairs of cylinders while exhausting the other, a bypass valve unit operatively connected to said connected pairs of cylinders, said unit comprising a casing, a valve member movable in said casing to different positions of adjustment, means for moving said valve member to one position of adjustment to permit fluid to pass from the cylinders connected to pressure to the cylinders connected to exhaust when said rams approach their limit of travel in one direction, and additional means for actuating said valve member to another position of adjustment to permit fluid to pass from the other of said cylinders subjected to pressure to the cylinders connected to exhaust when said rams approach their limit of travel in the reverse direction.

12. In a device of the class described, the combination with a fluid motor, of a bypass valve unit operatively connected to said motor, said unit comprising a casing, and a valve member movable in said casing to different positions of adjustment, a plurality of bypass means provided in said valve member, a check valve provided in each of said bypass means to permit fluid passage therethrough in one direction only, means for normally retaining said member in ineffective position, means for moving said member to one position of adjustment to render effective one of said bypass means to permit fluid to bypass from the pressure end of said motor to the exhaust end thereof when the motor approaches its limit of travel in one direction, and means for moving said member to another position of adjustment to render another of bypass means effective to permit fluid to bypass from the pressure end of said motor to the exhaust end thereof when said motor approaches its limit of travel in the reverse direction.

13. In a device of the class described, the combination with a fluid motor, of a valve unit operatively connected to said motor, said unit comprising a substantially cylindrical casing, a valve member movable in said casing to different positions of adjustment, guide rods for said valve member, adjustable spring means for retaining said valve member in normally ineffective position, one or more passages provided in said valve member, a check valve for each of said passages, whereby fluid may pass therethrough in one direction only, adjustable means for urging said check valves upon their seats to normally prevent the passage of fluid therethrough, means for actuating said valve member to one position of adjustment to render one of said passages effective to permit fluid to bypass from the pressure end of said motor to the exhaust end thereof when the motor approaches its limit of travel in one direction, and means for actuating said valve member in the reverse direction to render another of said passages effective to permit fluid to bypass from the pressure end of said motor to the exhaust end thereof when said motor approaches its limit of travel in the reverse direction.

14. In a device of the class described, the combination with a fluid motor, of a valve unit operatively connected to said motor, said unit comprising a casing, a valve member operable in said casing to different positions of adjustment, said valve member having two or more passages provided therein in spaced relation, a check valve for each of said passages whereby fluid may pass therethrough in one direction only, means for actuating said valve member to one position to render one of said passages effective while rendering the other passages ineffective to permit fluid to bypass from the pressure end of said motor to the exhaust end thereof when the motor approaches its limit of travel in one direction, means for actuating said valve member to another position of adjustment to render another of said passages effective while rendering said first mentioned passage ineffective to permit fluid to bypass from the pressure end of said motor to the exhaust end thereof, when the motor approaches its limit of travel in the reverse direction, and resilient means for actuating said valve unit to normal position whereby all of said passages are rendered ineffective.

15. In a device of the class described, the combination with a fluid motor, of a bypass valve unit operatively connected to said motor, said unit comprising a casing, a valve member operative in said casing to different positions of adjustment, guide rods for said valve member, adjustable spring means for retaining said valve member in normally ineffective position, two or more passages provided in said valve member in spaced relation, a check valve for each of said passages whereby fluid may pass therethrough in one direction only, means for actuating said valve member in one direction to render one of said passages effective to permit fluid to bypass from the pressure end of said motor to the exhaust end thereof when the motor approaches its limit of travel in one direction, means for actuating said valve member to another position of adjustment to render another of said passages effective to permit fluid to bypass from the pressure end of said motor to the exhaust end thereof when the motor approaches its limit of travel in the reverse direction, and means provided on said guide rods for bodily moving said spring means when said valve member is adjusted to thereby retain the same in proper position.

CARL F. SIBBE.